(12) United States Patent
Vaknin

(10) Patent No.: US 6,836,032 B2
(45) Date of Patent: Dec. 28, 2004

(54) ELECTROMAGNETIC MOVING-COIL DEVICE

(75) Inventor: Yuval Vaknin, Nesher (IL)

(73) Assignee: Levram Medical Systems, Ltd., Nesher (IL)

( * ) Notice: Subject to any disclaimer, the term of this patent is extended or adjusted under 35 U.S.C. 154(b) by 0 days.

(21) Appl. No.: 10/294,479

(22) Filed: Nov. 14, 2002

(65) Prior Publication Data

US 2004/0095026 A1 May 20, 2004

(51) Int. Cl.[7] .............................................. H02K 41/00
(52) U.S. Cl. ...................................... 310/12; 335/220
(58) Field of Search ............................. 310/12, 13, 14; 335/220

(56) References Cited

U.S. PATENT DOCUMENTS

| | | | | |
|---|---|---|---|---|
| 4,251,762 A | * | 2/1981 | Williams ..................... 318/653 |
| 4,607,382 A | * | 8/1986 | Dijkstra et al. ............... 381/59 |
| 4,963,806 A | * | 10/1990 | Shinohara et al. .......... 318/621 |
| 5,496,153 A | * | 3/1996 | Redlich ....................... 417/212 |
| 5,787,570 A | * | 8/1998 | Ressmeyer et al. ...... 29/603.09 |
| 5,897,296 A | * | 4/1999 | Yamamoto et al. ........ 417/44.1 |
| 6,315,277 B1 | * | 11/2001 | Nagasawa .............. 267/140.14 |
| 6,663,348 B2 | * | 12/2003 | Schwarz et al. .............. 417/12 |

* cited by examiner

Primary Examiner—Thanh Lam
Assistant Examiner—Judson H. Jones

(57) ABSTRACT

The electromagnetic moving-coil device in which a position coil is provided to function as a secondary coil in accordance with the principles of a linear variable differential transformer so that when a high-frequency excitation signal is superimposed upon the driver signal applied to the moving coil, a position coil picks up the position of the moving coil and allows that position to be computed or displayed.

8 Claims, 11 Drawing Sheets

ELECTROMAGNETIC MOVING-COIL DEVICE

FIELD OF THE INVENTION

Our present invention relates to electromagnetic moving-coil devices and, more particularly, to a so-called voice coil device with position detection.

BACKGROUND OF THE INVENTION

In both linear and rotary motors, the detection of the position of a moving coil is often necessary or desirable, particularly when the motor is utilized in a closed loop control system or is a servomotor where knowledge of the position of the displaced element or load is necessary or desirable.

Position detectors utilized in the past have included incremental encoders, resolvers, Hall-effect transducers and even linear variable differential transformers (LVDT) connected to the moving coil or the actuator. In all of these systems, the detector itself is a separate element or device which is usually external of the servomotor or actuator and may take up space which could be better utilized in miniaturization systems and must be mechanically coupled to the moving part of the system.

OBJECTS OF THE INVENTION

It is the principal object of the present invention to provide an improved motor or actuator with internal position detection whereby the aforementioned disadvantages can be avoided.

Another object of the invention is to provide an improved electromagnetic moving-coil device which allows for reliable position detection in a compact system.

Still another object of this invention is to provide an electromagnetic moving-coil device or voice-coil actuator which is especially effective in miniature applications.

SUMMARY OF THE INVENTION

These objects and others which will become apparent hereinafter are attained, in accordance with the invention, by integrating an LVDT into a moving-coil or voice-coil actuator. More particularly, an electromagnetic moving-coil device can comprise:

a magnetically permeable flux-guiding outer member surrounding a space;

a moving coil within the space electrically energizable by a coil-displacement current for relative displacement of the member by interaction of magnetic fields of the member and the coil;

a flux-guiding core member surrounded by the coil, at least one of the members being provided with a permanent magnet producing a magnetic flux closing between the members and intercepted by the coil;

a high-frequency source connected to the coil for superimposing a high-frequency signal on the current; and at least one winding on one of the members for picking up by differential transformer action a signal representing relative movement of the coil and the members.

In the system of the invention, therefore, at least one winding is provided on one of the flux-guide members, preferably the outer or sleeve member, for picking up by the differential transformer action a signal representing the relative movement of the coil and the members. Normally the sleeve or outer member and the core or near member are connected together at one end of the device and form a stationary member or stator while the moving coil is the movable part.

According to a feature of the invention, the members and the coil form a linear actuator.

The device can comprise a detector circuit connected to the winding and providing an output representing movement of the coil relative to the members.

A filter can be provided ahead of the detector circuit to remove the contribution of the PWM driver and hence interference from the energization current on the signal representing relative movement of the coil and the members.

A reference circuit can be provided to provide a base line for the output of the detector circuit and the reference circuit, for example, an automatic gain control or AGC, can be connected to a comparator with the detector circuit so that the comparator output will provide a signal having a reference point and thus representing a reference position of the coil. The current which drives the coil can be provided by a pulse width modulated or PWM driver.

The invention is particularly effective for so-called voice-coil actuators, i.e. actuators in which the coil is displaced by a current passed through it by the interaction of the magnetic field generated by that current with a flux produced by a permanent magnet and thus a coil which can be analogized to the coil of a loudspeaker.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
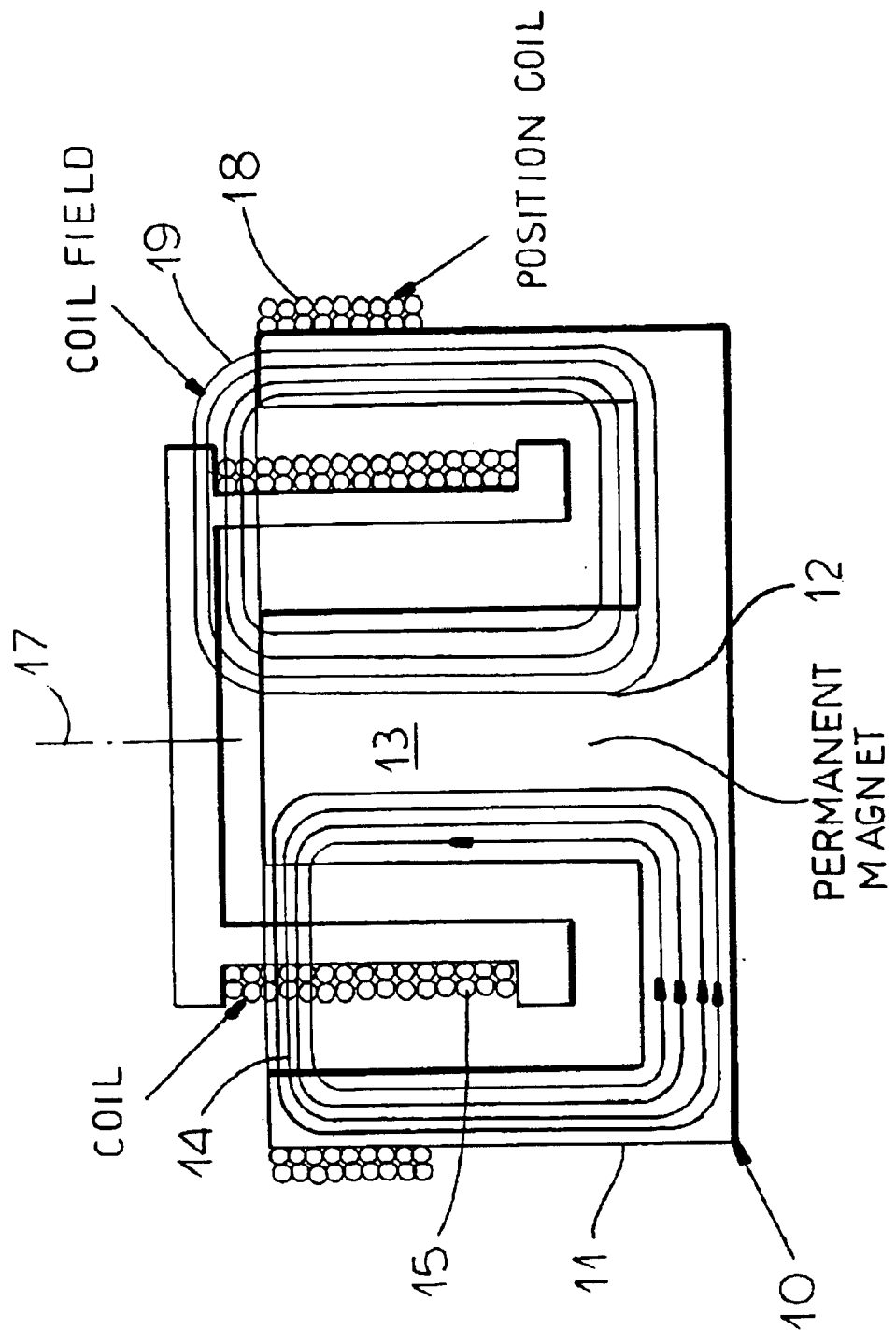
FIG. 1 is an axial cross sectional view through a moving linear coil actuator that is provided with a position detector in one position of the coil.
Figure 2:
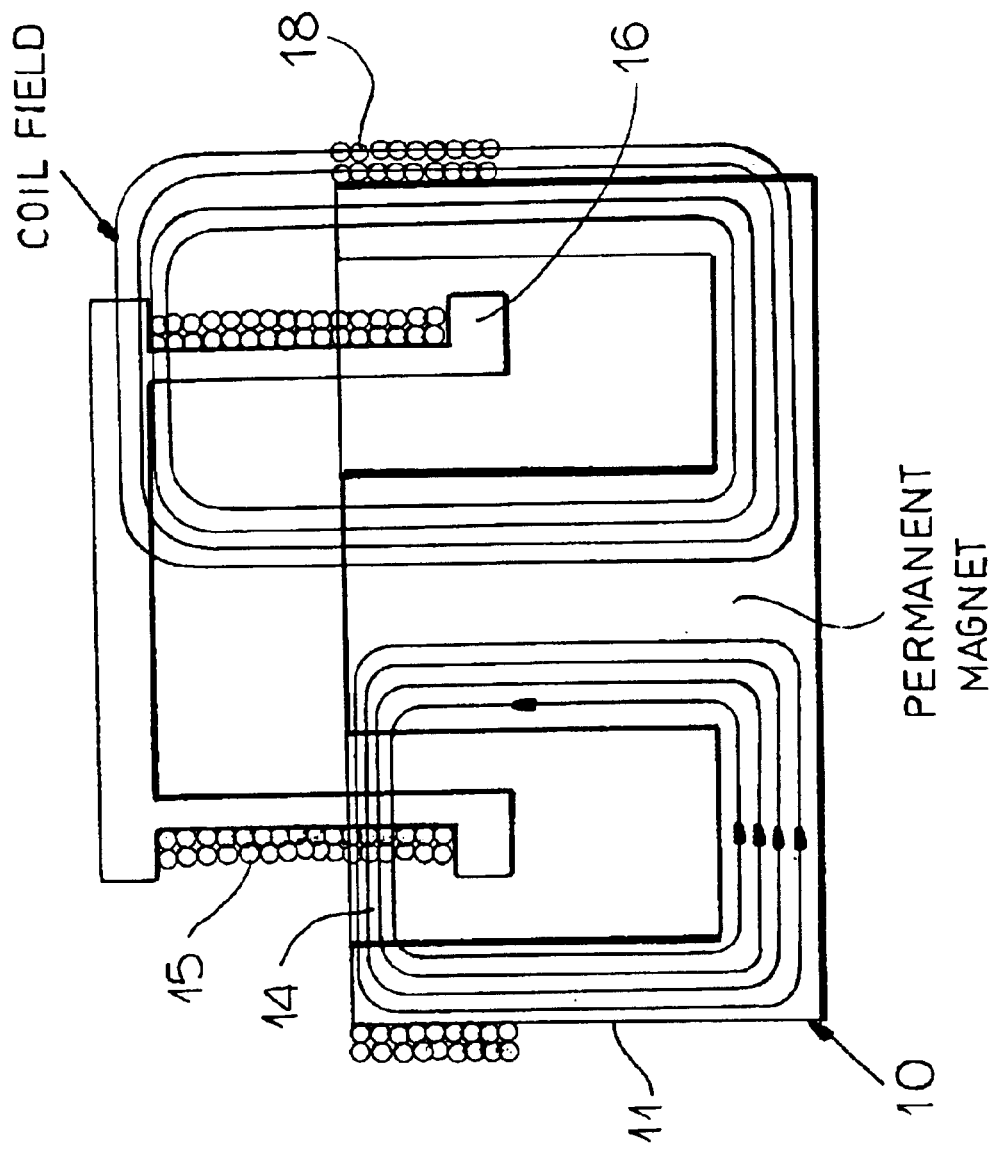
FIG. 2 is a view similar to FIG. 1 with the coil in a second position.

FIGS. 1 and 2 show, in highly diagrammatic form, a moving coil linear actuator 10 which comprises a magnetically permeable sleeve or cylinder 11 and a magnetically permeable core 12 which are flux-conductive and are composed for example, of vanadium permadur. One of these members or both can be provided with a permanent magnet such as has been shown at 13 which can be axially polarized or can receive a permanent magnet which is radially polarized (see the commonly owned copending application Ser. No. 10/305,789, filed Nov 27, 2004 and entitled MOVING COIL LINEAR ACTUATOR), or otherwise is provided with a permanent magnet generating a flux or field which closes across the open end of the stator as represented by the flux line 14.

The actuator coil 15 forms a bobbin on the magnetically permeable carrier 16 which can be coupled as represented by the dot-dash line 17 with a load.

According to the invention, the stator is provided with a position-detecting coil 18 having at least one winding, here shown to be formed on the outside of the cylinder 11 although it can be provided on the core or in the air gap between the cylinder and the core as well. The position coil 18 and the driver coil 15 form windings of a differential transformer as will be explained in greater detail below.

As can be seen by a comparison of FIGS. 1 and 2, in the absence of the driver coil 15 and its support 16, the flux lines close at 14 between the poles of the unit constituted by the open end of the cylinder 11 and the free end of the core 12 containing the permanent magnet. When the bobbin is in its innermost position (FIG. 1), the flux lines close as shown at 19 through the bobbin.

When the coil 15 is energized, the driver coil 15, by interaction with the magnetic field, moves outwardly (FIG. 2) so that additional field lines close through the position coil and induce an electric current therein by the linear differential transformer effect. The signal tapped from the position coil 18 thus represents the position of the driver coil 15 and the bobbin as well as of the load connected thereto at 17. Thus if there is delivered to the driver coil 15, in addition the pulse-width modulated signal which displaces the coil 15, a high-frequency voltage to the driver coil and the position coil act as a transformer with the position coil being a secondary coil. To the extent that the driver coil is outside the stator, more high-frequency will be coupled to the secondary coil. It is that increase in the high-frequency signal which is detected as a measure of the position of the driver coil.

Figure 6:
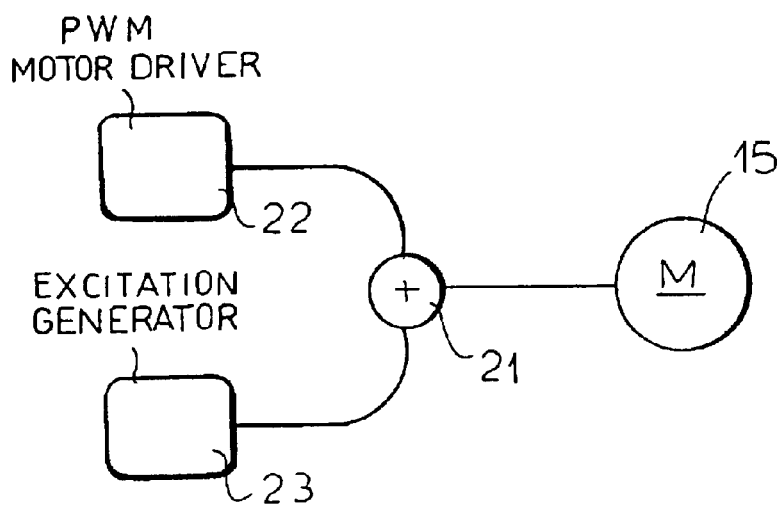
FIG. 6 is a diagram illustrating the application of the signals to the coil in accordance with one embodiment of the invention.
Figure 7:
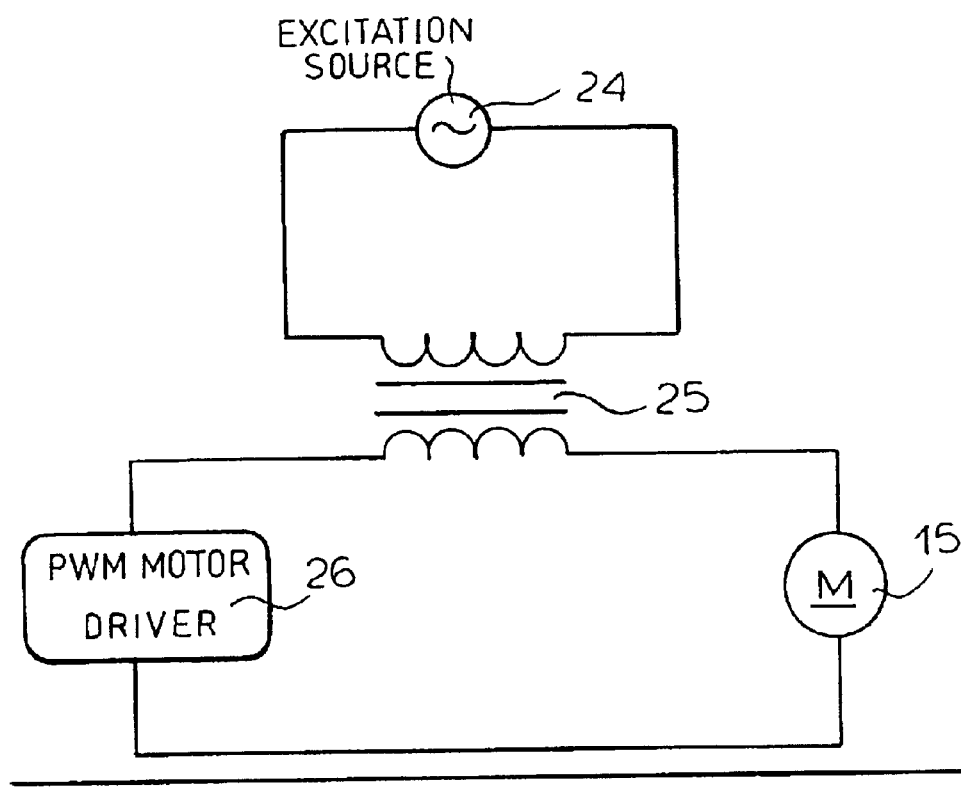
FIG. 7 is a graph showing another mode of superimposition of the excitation signal on the coil driver signal.
Figure 8:
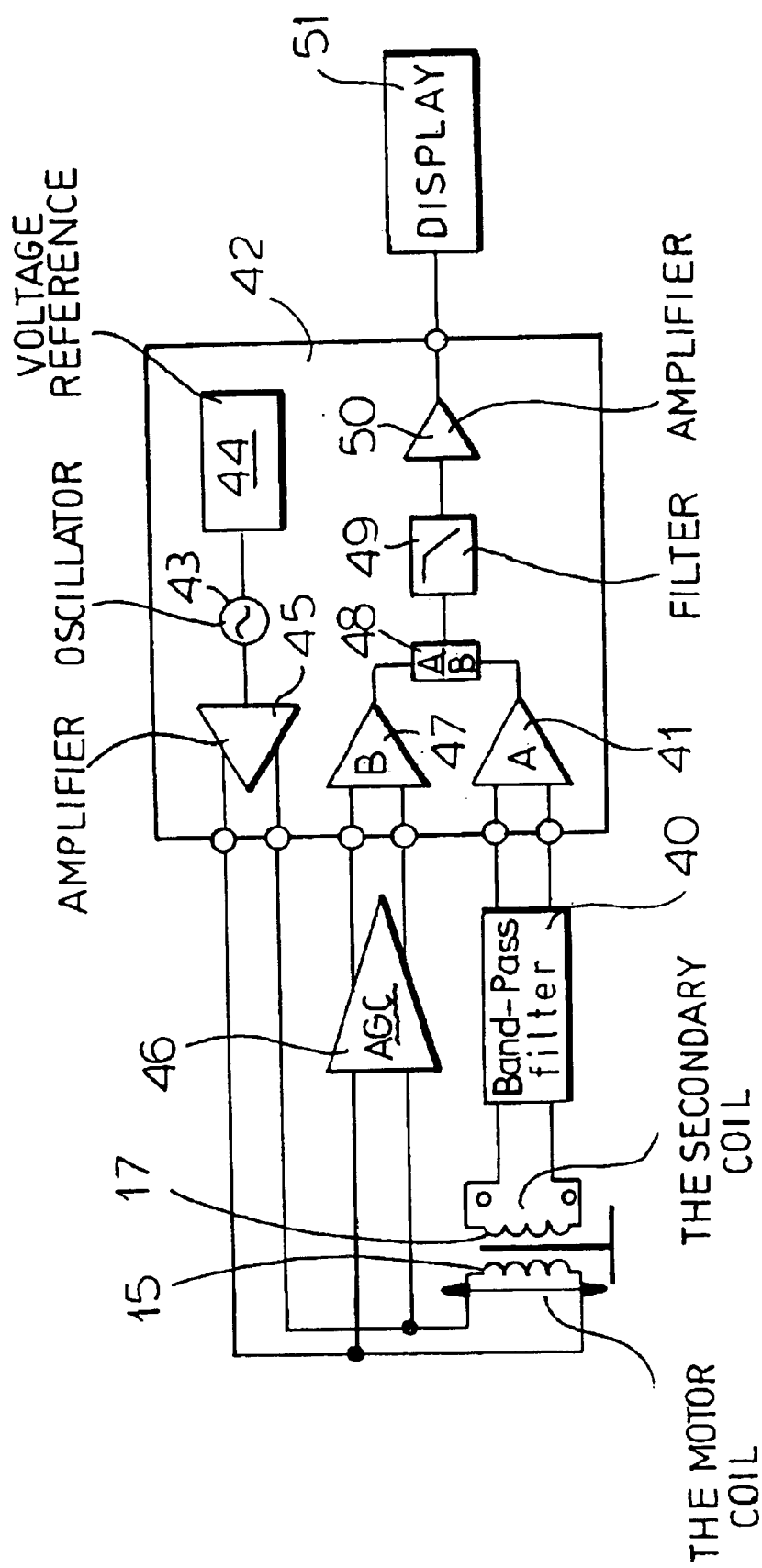
FIG. 8 is a block diagram showing the derivation of the output from the winding.

As can be seen from FIG. 6, the high-frequency signal and the driver signal may be coupled to the driver coil 15 by modulating with an addition circuit 21 the PWM signal from a driver 22 with the high-frequency signal from an excitation generator 23. Alternatively, the signal from the excitation source 24 may be applied through a current transformer 25 to the lines connecting the PWM driver 26 to the coil 15.

Figure 3:
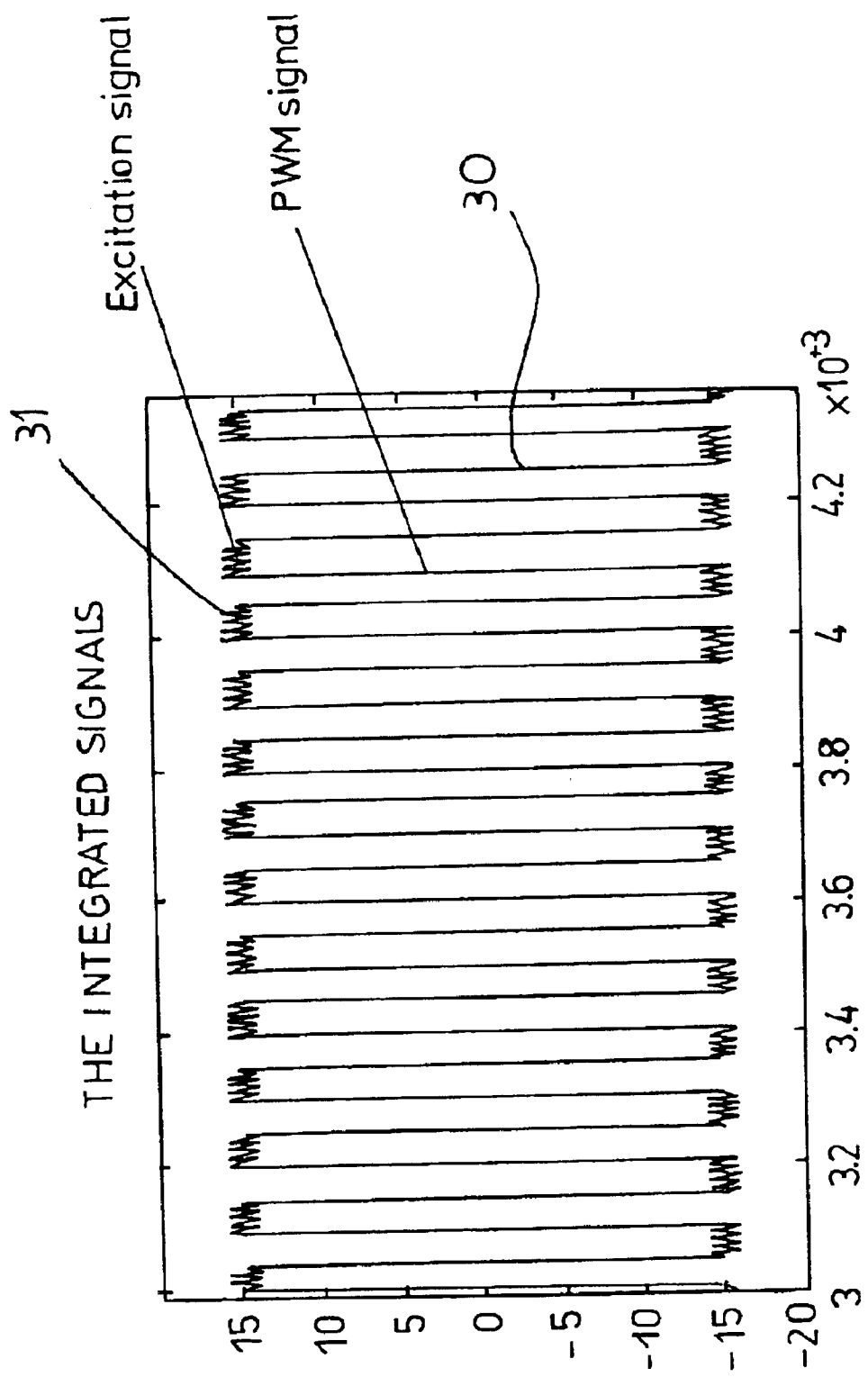
FIG. 3 is a graph showing the superimposition of the high-frequency excitation signal upon a PWM signal.

The integrated signals are shown in FIG. 3 where the PWM signal or driver for the coil has been represented at 30 and the high-frequency excitation signal at 31.

Figure 4:
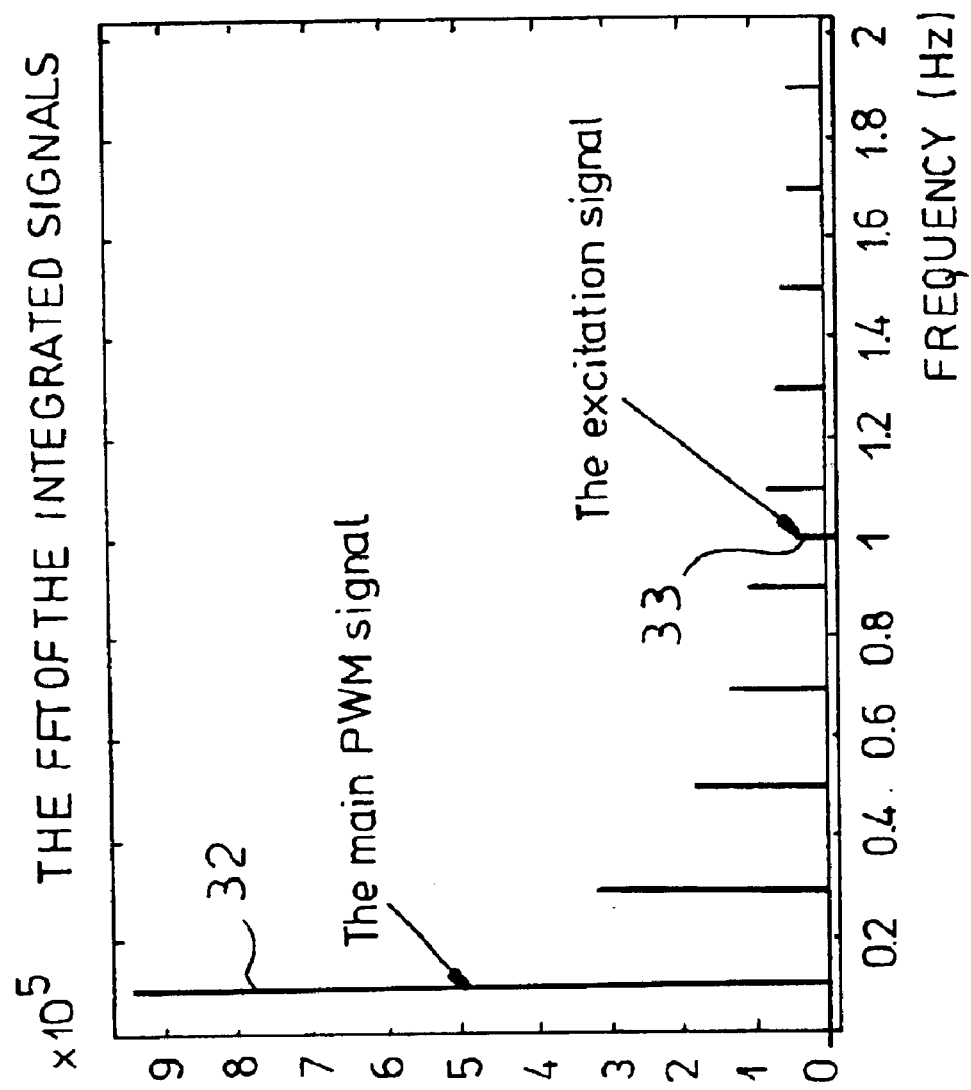
FIG. 4 is a graph of a fast Fourier transform of the integrated signal showing the isolated excitation signal as representative of the position of the moving coil.

In FIG. 4 the Fourier transform of the integrated signal is shown by comparison to the lower frequency driver signal. Here the driver signal is represented at 32 and the high-frequency excitation signal at 33.

Figure 5:
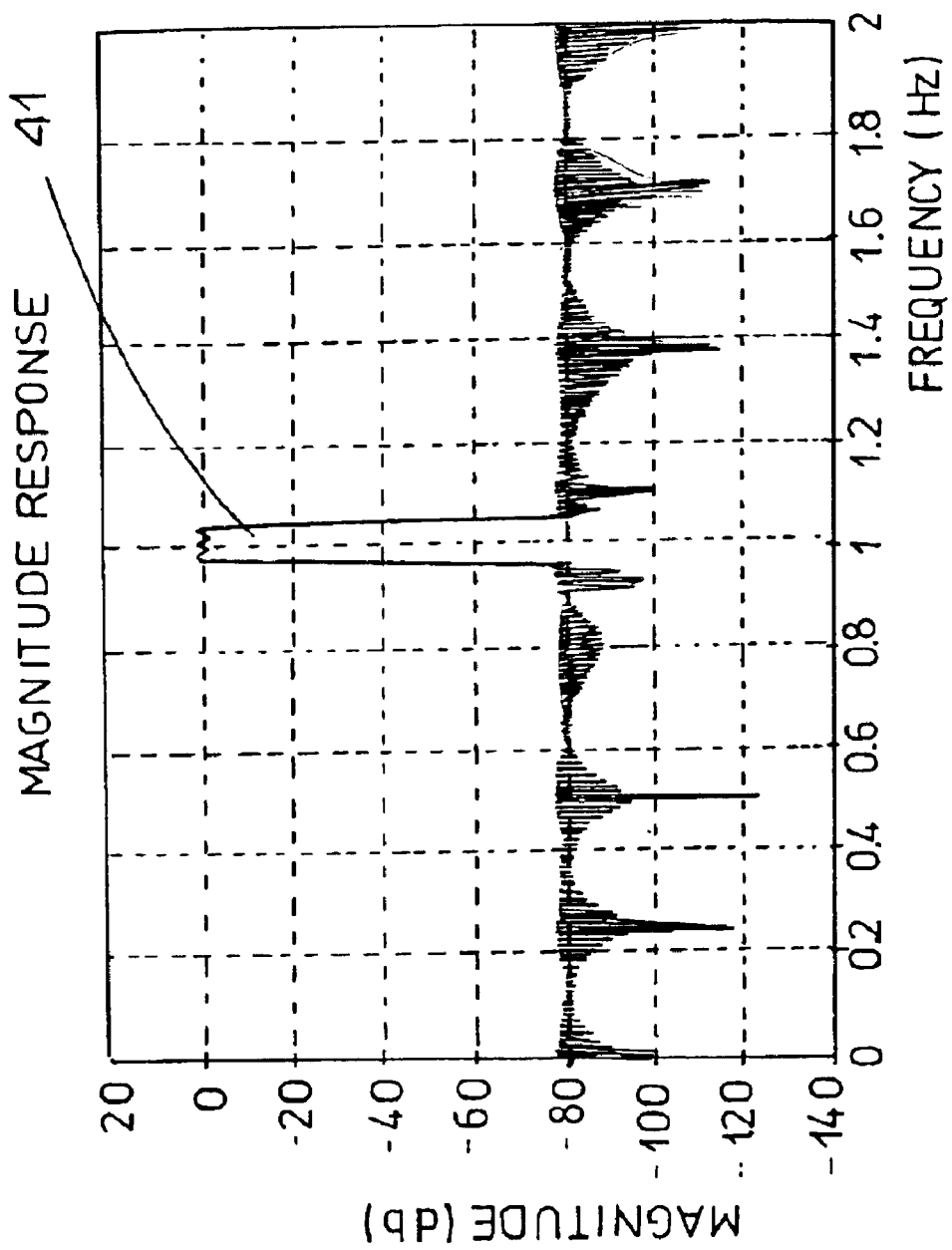
FIG. 5 is a graph of the response of the suggested filter.

FIG. 5 shows a graph of the band pass effect required for a Band-Pass filter 40 and the detection circuit. The pass peak is shown at 41 and the represented magnitude, of course, is a function of the extent to which the coil is displaced out of the stator.

The detection circuit can comprise the Band-Pass filter 40 and an amplifier 41. Here the position coil 17 is represented as a secondary winding of the transformer formed by the actuator with the motor coil being represented at 15. The high frequency is shown to be applied to the motor coil 15 in this embodiment from a printed circuit board 42 having an oscillator 43 with a band-voltage source 44 with a driver connected to the coil 15 through the amplifier 45. The PWM driver is not shown here.

To provide a reference point for the output of the detector 41, a reference voltage is provided to create a reference position. The reference source is here an automatic gain control 46 working into an amplifier 47 whose output forms a ratio with the output from amplifier 41 at 48. The ratio former 48 has its output connected to a notch filter 49 which separates the excitation signal from the PWM signal. The output through the amplifier 50 can be displayed by a display device 51 connected to the output terminal of the amplifier. In FIG. 5, an attenuation of −80 db has been shown but −10 b is found to be enough for 100 $\mu$m position detection. The excitation frequency can be 10 times or more the PWM frequency.

Figure 9:
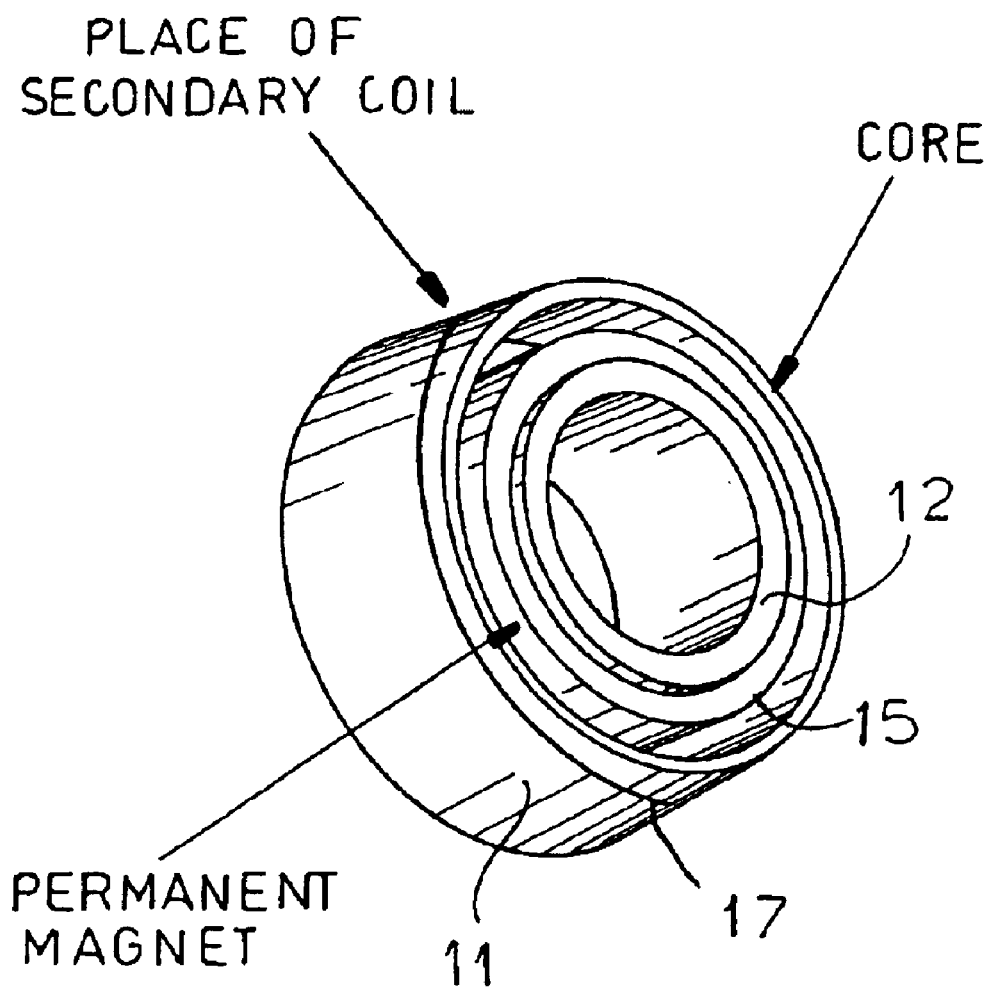
FIG. 9 is a perspective view of a moving coil linear motor embodying the invention.

FIG. 9 shows a compact unit embodying the invention and in which the position coil 17 is wound on the outer shell 11 while the core 12 is hollow and is permanently magnetized. The voice coil is shown at 15 in this compact linear actuator.

Figure 10:
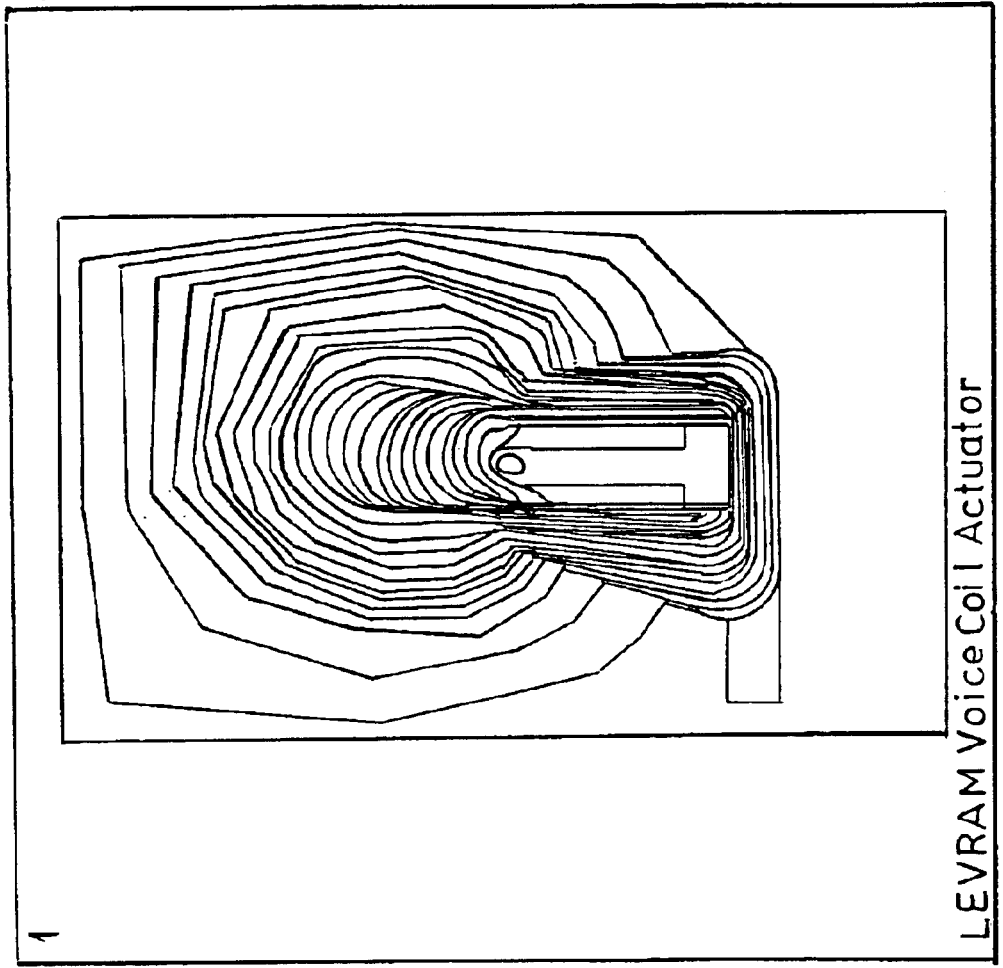
FIGS. 10, 11 and 12 are plots showing the flux patterns in full stroke, mid-stroke and zero stroke of the moving coil or bobbin.
Figure 11:
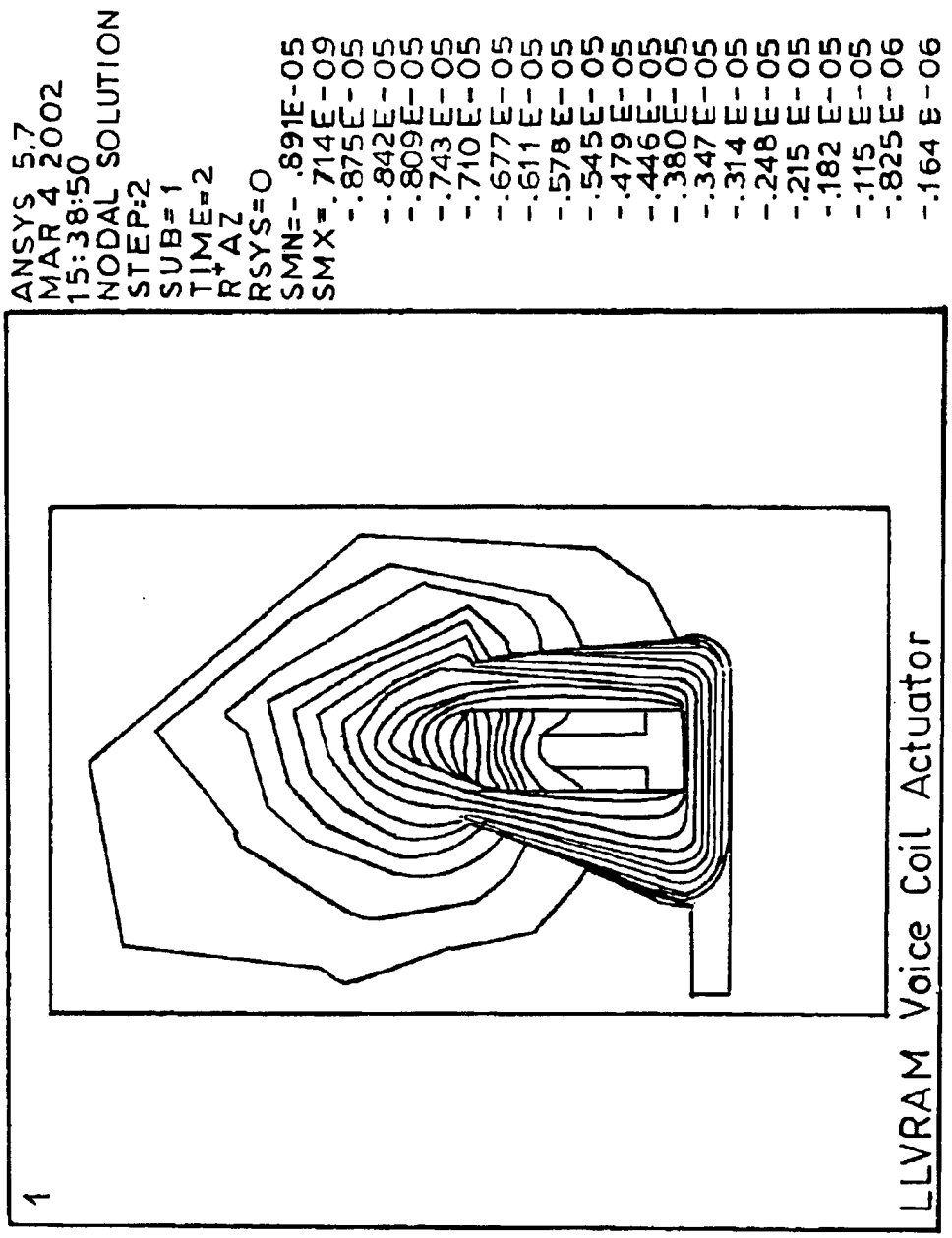
Figure 12:
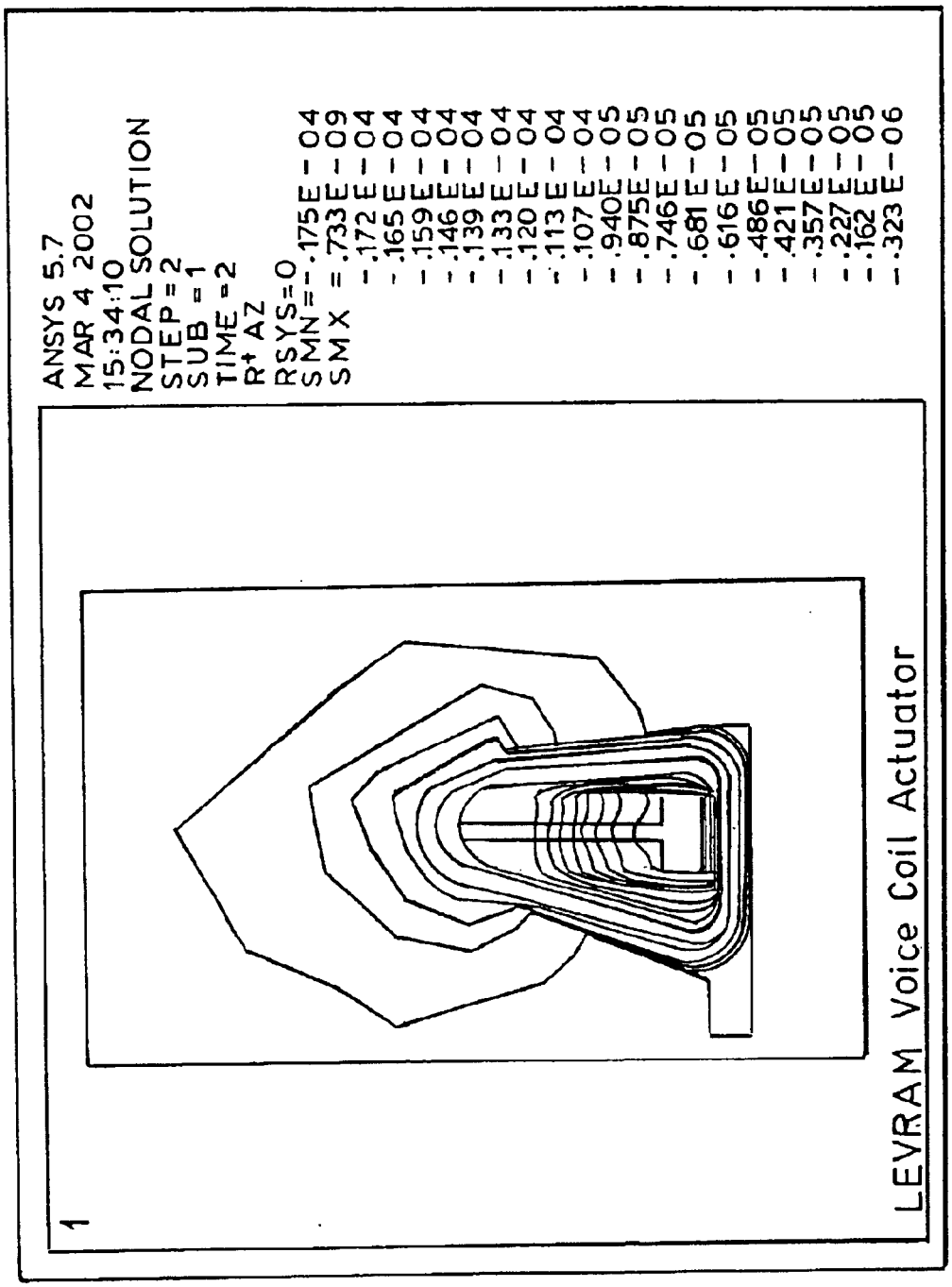

FIGS. 10, 11 and 12 show the field patterns for the motor coil at full stroke, half stroke and zero stroke, respectively. The field lines shown are only those of the coil and the permanent magnet line field have not been illustrated. The secondary coil is outside the ring. Note that the motor coil is at zero stroke (FIG. 12). The field lines are all almost completely closed through the core.

I claim:

1. An electromagnetic moving-coil device comprising:
    a magnetically permeable flux-guiding outer member surrounding a space;
    a moving coil within said space electrically energizable by a coil-displacement current for relative displacement of said member by interaction of magnetic fields of said member and said coil;
    a flux-guiding core member surrounded by said coil, at least one of said members being provided with a permanent magnet producing a magnetic flux closing between said members and intercepted by said coil;
    a high-frequency source connected to said coil for superimposing a high-frequency signal on said current; and
    at least one winding on one of said outer and core members for picking up by differential transformer action a signal representing relative movement of said coil and said members.

2. The electromagnetic moving-coil device defined in claim 1 wherein said members and said coil form a linear actuator.

3. The electromagnetic moving-coil device defined in claim 1 wherein said members and said coil form a linear motor.

4. The electromagnetic moving-coil device defined in claim 1, further comprising a detector circuit connected to said winding and providing an output representing movement of said coil relative to said members.

5. The electromagnetic moving-coil device defined in claim 4, further comprising a filter ahead of said detector circuit to remove interference from the energization current on said signal representing relative movement of said coil and said members.

6. The electromagnetic moving-coil device defined in claim 5, further comprising a reference circuit connected to said source for producing a reference output and a comparator receiving said reference output and an output from said detector circuit and producing a signal representing a referenced position of said coil.

7. The electromagnetic moving-coil device defined in claim 6 wherein said reference circuit includes an automatic gain control.

8. The electromagnetic moving-coil device defined in claim 1, further comprising a pulse width modulated driver for applying said coil-displacement current to said coil.

* * * * *